United States Patent
Ince et al.

(10) Patent No.: US 10,253,818 B1
(45) Date of Patent: Apr. 9, 2019

(54) BEARING WITH ELECTRICAL SHUNT

(71) Applicant: SCHAEFLER TECHNOLOGIES AG & CO. KG, Herzogenaurach (DE)

(72) Inventors: Marion Jack Ince, Mount Holly, NC (US); Hareshkumar Dalsaniya, Charlotte, NC (US)

(73) Assignee: SCHAEFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/837,220

(22) Filed: Dec. 11, 2017

(51) Int. Cl.
F16C 19/00 (2006.01)
F16C 41/00 (2006.01)
F16C 33/78 (2006.01)
F16C 19/06 (2006.01)

(52) U.S. Cl.
CPC ............ F16C 41/002 (2013.01); F16C 19/06 (2013.01); F16C 33/7843 (2013.01)

(58) Field of Classification Search
CPC ........ F16C 19/06; F16C 19/16; F16C 19/163; F16C 19/52; F16C 19/33; F16C 19/7846; F16C 19/82; F16C 41/002
See application file for complete search history.

(56) References Cited

U.S. PATENT DOCUMENTS

| | | | |
|---|---|---|---|
| 3,271,723 A | 9/1966 | Willing | |
| 3,564,477 A | 2/1971 | Pompei | |
| 4,801,270 A | 1/1989 | Scarlata | |
| 7,339,777 B2 | 3/2008 | Barnard et al. | |
| 9,175,728 B2 | 11/2015 | White | |
| 2014/0334758 A1* | 11/2014 | White | F16C 33/7843 384/477 |
| 2017/0108047 A1* | 4/2017 | White | F16C 19/52 |

FOREIGN PATENT DOCUMENTS

| | | | | |
|---|---|---|---|---|
| DE | 29916854 U1 | * | 1/2000 | .......... F16C 33/7843 |
| EP | 1203897 A1 | | 5/2002 | |
| JP | H065621 U | * | 8/1994 | ............ F16C 33/783 |
| JP | 07071451 A | * | 3/1995 | .............. F16C 19/52 |
| JP | 4035879 B2 | * | 1/2008 | .......... F16C 33/7846 |
| WO | 2012167017 A2 | | 6/2012 | |

* cited by examiner

*Primary Examiner* — Phillip A Johnson
(74) *Attorney, Agent, or Firm* — Brooks Kushman P.C.

(57) ABSTRACT

A rolling element bearing includes an inner ring and an outer ring, with rolling elements therebetween. The plurality of rolling elements collectively define a pitch diameter. An electrically-conductive shunt ring has an outer diameter surface and an inner diameter surface, one of which contacting either the outer ring or the inner ring, and the other not directly contacting the rings. A plurality of fingers extend from the contacting diameter surface. A plurality of carbon fiber elements extend from each finger and contact the other of the rings, to conduct electrical current between the inner ring and outer ring. The non-contacting diameter surface of the shunt ring defines a diameter that exceeds the pitch diameter to enable free-flow of lubricant through the bearing.

18 Claims, 5 Drawing Sheets

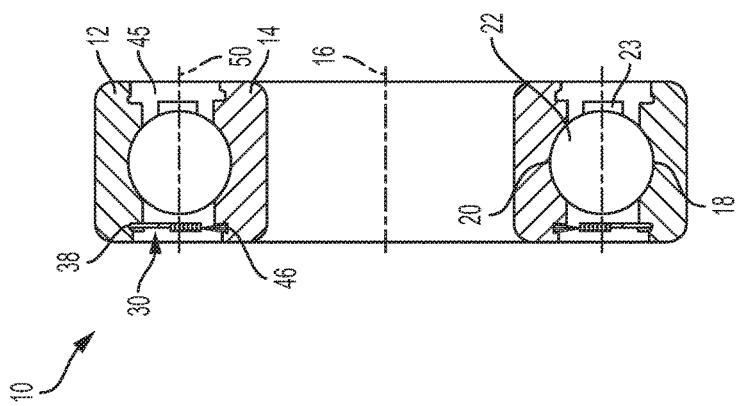
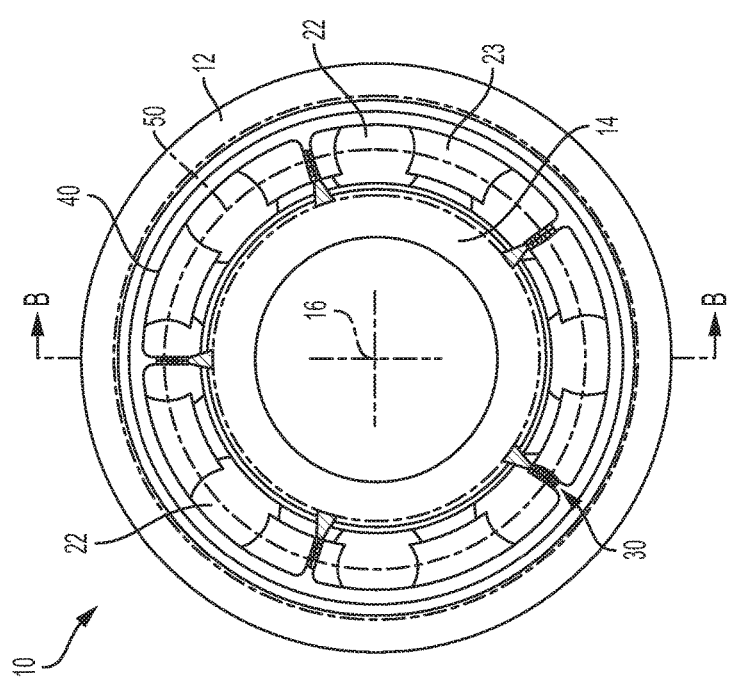
FIG. 1B
FIG. 1A

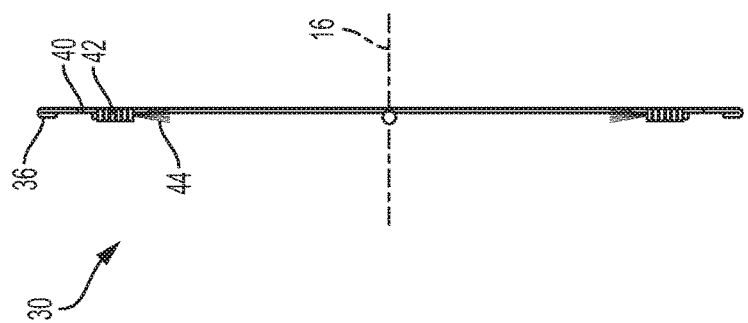
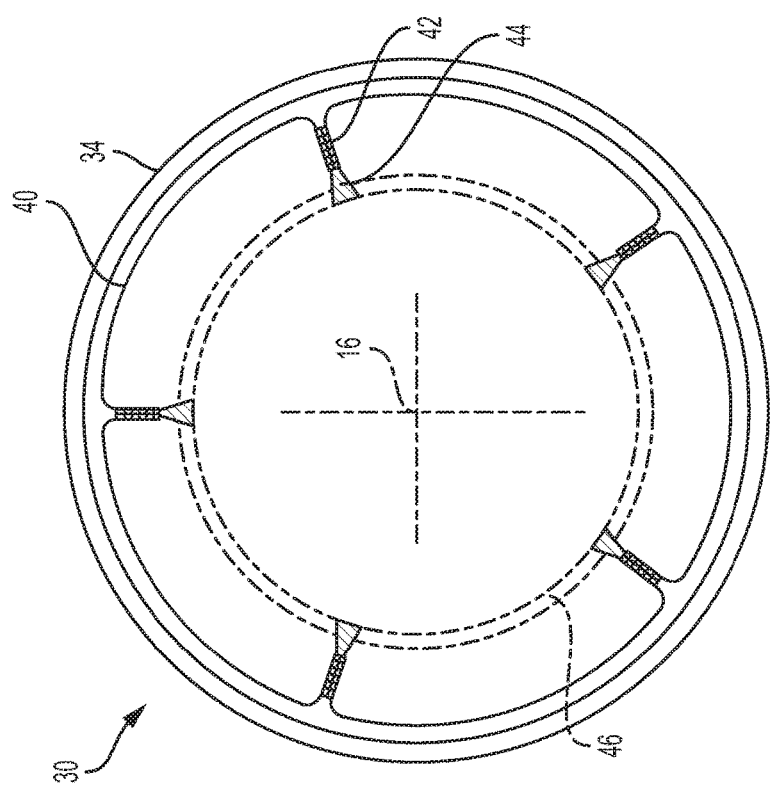

BEARING WITH ELECTRICAL SHUNT

TECHNICAL FIELD

The present disclosure relates to an electrical shunt formed integral or assembled within a bearing. In particular, the electrical shunt may be specifically designed for wet (non-sealed) bearing, such as a bearing subjected to lubricant such as automatic transmission fluid.

BACKGROUND

Bearings are used in a plethora of applications in which relative rotation is desired between two coaxial components. Bearings such as roller bearings may include an inner ring with a raceway, an outer ring with a raceway, and a plurality of rolling elements (e.g., balls) between resting in the raceways. In some applications, the bearings are sealed such that no fluid, debris, etc. is able to enter the raceways and impair the operability of the bearing. In other applications, the bearings are not sealed to allow fluid (e.g., lubricant) to pass through the bearing during operation. Both sealed and non-sealed bearings alike can be used in applications in which electrical current is present. Certain amounts of electrical current, if not properly grounded or diverted, can impair the operability of the bearing or cause damage.

SUMMARY

According to one embodiment, a bearing includes an inner ring about a central axis, and an outer ring disposed radially outward from the inner ring. A plurality of rolling elements are disposed between the inner ring and the outer ring, and are configured to enable relative circumferential movement between the inner ring and the outer ring. The plurality of rolling elements define a pitch diameter. An electrically-conductive shunt ring has an outer diameter surface contacting the outer ring, and an inner diameter surface, the shunt ring being axially spaced from the rolling elements. A plurality of fingers extend from the inner diameter surface and toward the inner ring. A plurality of carbon fiber elements extend from each finger and contact the inner ring to conduct electrical current between the inner ring and outer ring. The inner diameter surface of the shunt ring defines a diameter that exceeds the pitch diameter to enable free-flow of lubricant through the bearing.

In another embodiment, a bearing includes an inner ring extending about an axis and an outer ring concentric with and radially outward from the inner ring. A plurality of rolling elements are disposed between the inner ring and the outer ring, the rolling elements collectively defining a pitch diameter. An electrically-conductive shunt ring couples the inner ring to the outer ring and is configured to inhibit electrical current passing between raceways of the inner ring and outer ring from passing through the rolling elements. The bearing is open on either axial side of the rolling elements and the shunt ring is sized to enable lubricant to flow freely.

The shunt ring may have an outer diameter surface contacting the outer ring, and an inner diameter surface defining a diameter that exceeds the pitch diameter.

In another embodiment, a bearing includes an inner ring extending about an axis, and an outer ring concentric with and radially outward from the inner ring. A plurality of rolling elements are disposed between the inner ring and the outer ring, wherein the inner and outer rings define a pair of axial sides of the bearing that are open and not sealed to allow lubricant to flow through the bearing and contact the rolling elements. An electrically-conductive shunt ring has an outer end contacting the inner ring. The shunt ring has a plurality of conductive fingers circumferentially spaced apart and extending radially outward toward the outer ring to conduct electrical current between the inner ring and outer ring.

BRIEF DESCRIPTION OF THE DRAWINGS

FIG. 1A is a front view of a rolling element bearing with a conductive shunt assembly, according to one embodiment; FIG. 1B is a cross-sectional view of the bearing taken along line "B-B" of FIG. 1A.

FIG. 2A is a front isolation view of the conductive shunt assembly according to one embodiment; FIG. 2B is a side view of the conductive shunt assembly of FIG. 2A.

DETAILED DESCRIPTION

Figure 3B:
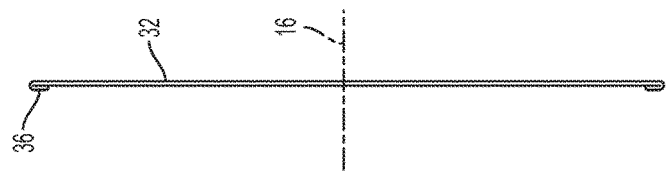
FIG. 3B is a side view of the shunt ring of FIG. 3A.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis.

FIG. 1A illustrates a front view of a bearing 10, and FIG. 1B illustrates a cross-sectional view of the bearing. The bearing 10 includes an outer ring 12 and an inner ring 14.

Each ring extends about a central axis 16. The outer ring 12 has an inner surface facing the central axis 16 that defines a concave raceway 18 facing the axis 16. Likewise, the inner ring 14 has an outer surface facing away from the central axis 16 that defines a concave raceway 20 facing away from the axis 16.

In the illustrated embodiment, the bearing is a rolling element bearing having a plurality of rolling elements 22. However, in other embodiments, the bearing is a non-rolling element bearing, such as a plain bearing, a flexure bearing, etc. The rolling elements 22 are shown as spherical ball rolling elements. In other embodiments, the rolling elements are other shapes such as cylindrical, frustoconical, and other shapes appreciable by those skilled in the art. The rolling elements 22 rest between and contact the raceways of the outer ring 12 and the inner ring 14. In one embodiment, the rolling elements 22 are mounted within, and retained, and can fully rotate via a cage 23. The cage reduces friction, wear, and bind by preventing the rolling elements 22 from rubbing against each other during operation of the bearing 10. The rolling elements 22 enable relative rotational movement between an outer element (not shown) connected to the outer ring, and an inner element (not shown) connected to the inner ring.

Rolling element bearings in automotive applications may be subject to electrical current passing through, seeking ground. This can particularly occur in hybrid vehicles, for example with a bearing for the electric motor. Electric arcing through the bearing raceways and rolling elements can cause electric discharge machining (EDM) damage. Over time, this has the potential to degrade the quality of the rolling elements and raceways of the bearing. Some bearing applications require lubricants, such as automatic transmission fluid (ATF), to be able to pass through the bearing. These are known as wet or non-sealed bearings.

Therefore, according to various embodiments of this disclosure, the bearing disclosed herein is a non-sealed bearing having a shunt device or shunt assembly to safely pass electric current around the bearing raceways and rolling elements to ground while still enabling a free flow of lubricant through the bearing.

One example of such a shunt assembly 30 is shown as part of the bearing 10 in FIGS. 1A-1B, and in isolation in FIGS. 2A-2B. The shunt assembly 30 includes an annular shunt ring 32 extending about the central axis 16. The shunt ring 32 has an outer surface 34 about the shunt ring's outer diameter (therefore also referred to as an outer diameter surface). The outer diameter surface 34 may be flanged over itself to define a flange 36 to provide a stiffened rounded outer surface which fits within a corresponding recess or ledge 38 within the outer ring 12.

Figure 3A:
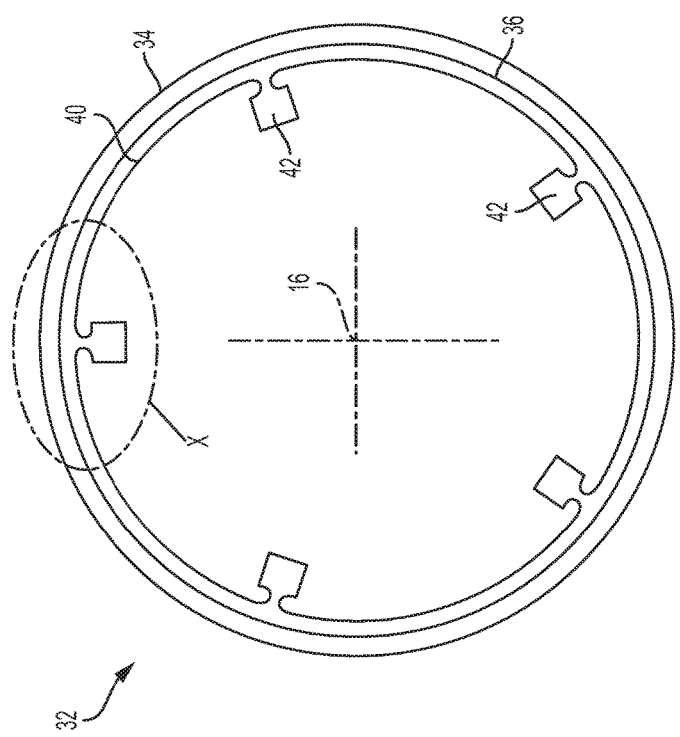
FIG. 3A is a front isolation view of a shunt ring of the shunt assembly prior to further forming of inwardly extending fingers, according to one embodiment.
Figure 3C:
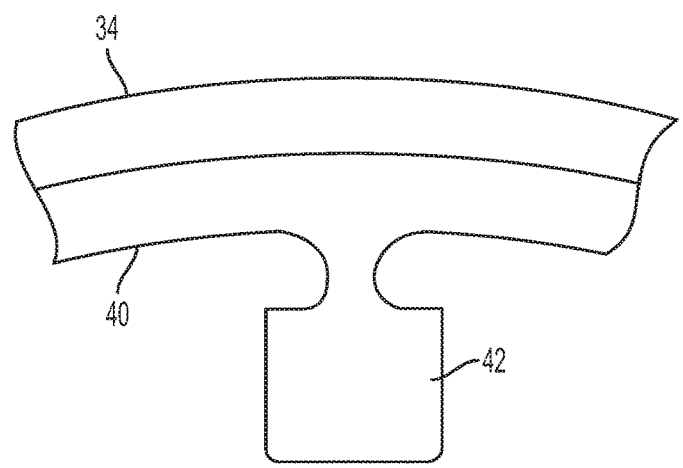
FIG. 3C is an enlarged view of section "X" of FIG. 3A to illustrate one finger of the shunt ring.

The shunt ring 32 also has an inner surface 40 about the shunt ring's inner diameter (therefore also referred to as an inner diameter surface). The inner diameter surface 40 is not continuous; rather, a plurality of fingers 42 extend radially inward from the inner diameter surface 40. Five fingers 42 are shown in the Figures, however more or less than five may be used. The fingers 42 are shown and described in additional detail with respect to FIGS. 3A-6B. For example, FIG. 3A shows the shunt ring 32 with the fingers 42 prior to forming or rounding. Referring back to FIGS. 1A-2B, the fingers 42 provide as a conductive attachment point for a plurality of conductive fibers 44. In one example, the fibers 44 are carbon fiber. Each finger at least partially surrounds and holds a grouping of the fibers 44. The conductive fibers 44 extend radially inward from the fingers 42 and directly contact a contact surface 46 of the inner ring 14. The contact surface 46 may be a ledge or other surface feature inboard of the outer diameter of the inner ring.

The shunt ring 32 is conductive, and may be stamped out of a conductive flat-stock material, such as beryllium copper. The shunt ring 32 may also be snapped into place within the recess 38 with an interference fit to make direct contact with the outer ring 12. The fibers are also conductive and contact the inner ring 14. This creates a continuous pathway between the outer ring 12 and inner ring 14 for electrical current to flow. Also, as shown in FIG. 1B, the shunt assembly 30 is axially spaced from the rolling elements 22, so that electrical current flows along a pathway separate and divided from the rolling elements 22 and the raceways. Thus, when the bearing is subjected to an electrical shock (e.g., from an associated electric motor), the current can be grounded safely without entirely traveling through the rolling elements and raceways.

As mentioned previously, the bearing 10 is a non-sealed, open bearing configured to enable lubricant (e.g., transmission fluid) to pass through the bearing. The shunt assembly 30 is therefore specifically designed to accommodate the fluid flow through the bearing while still enabling the free-flow of lubricant through the bearing.

To accomplish this, in one embodiment, the shunt assembly 30 has an inner diameter that is larger than the pitch diameter of the rolling elements. In particular, the rolling elements 22 collectively define a pitch diameter 50 passing through the center of the rolling elements 22. The inner diameter surface 40 defines an inner diameter of the shunt ring 32. The inner diameter of the shunt ring 32 exceeds the pitch diameter. In other words, the inward-most surface of the shunt ring 32 in the areas between the fingers 42 is outboard of the center of the rolling elements 22. The fingers 42 themselves may extend radially inward to a position substantially close to the inner ring 14, giving maximum support to the conductive fibers 44 and providing shielding of the fibers 44.

These geometrical relationships assure the shunt ring has its continuous outer surface in contact with the outer ring without significantly impacting the ability of the lubricant or fluid to flow into the inner regions of the bearing where the rolling elements and raceways are (e.g., through openings 45). This provides a particular advantage over shunt assemblies or shunt rings that would otherwise have an inner diameter that hangs below the pitch diameter to axially shield a majority of the rolling elements, which may not be of particular consequence in sealed bearings.

FIGS. 3A-6B show additional details of the shunt ring 32, its fingers 42 and fibers 44, and methods of manufacturing and assembling the same. Referring to FIGS. 3A-3C, as mentioned previously, the shunt ring 32 may be stamped from a single part, and the inner diameter may be pierced from the part such that the fingers are made during material removal. The fingers 42 may be formed during the stamping process. The shunt ring 32 may be flanged or bent at its outer diameter to form the outer diameter flange 36 which provides additional support at the outer diameter surface.

Figure 4A:
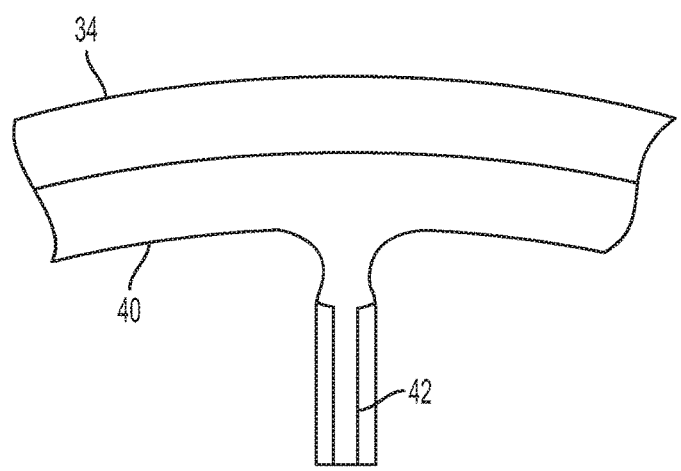
FIG. 4A is a front view of the finger of the shut ring after forming (e.g., rounding) of the finger.
Figure 4B:
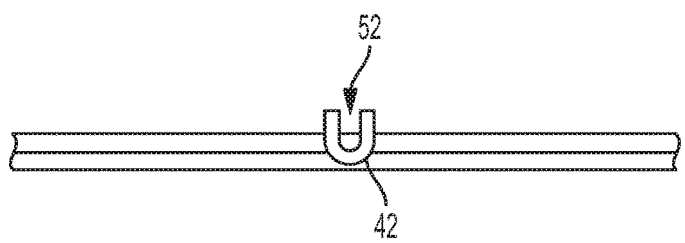
FIG. 4B is a bottom view of FIG. 4A.
Figure 5:
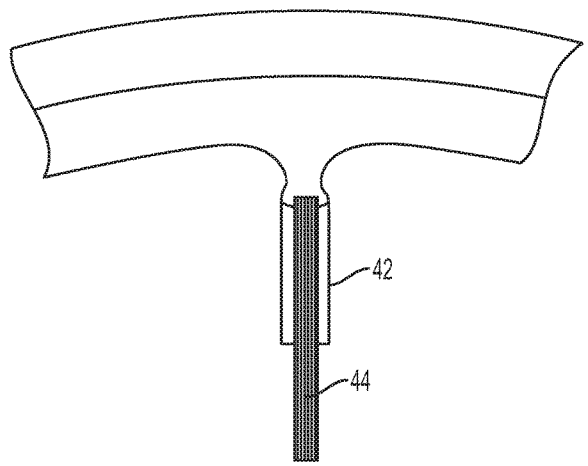
FIG. 5 is a front view of the rounded finger with a conductive fiber inserted into the rounded finger, according to one embodiment.
Figure 6A:
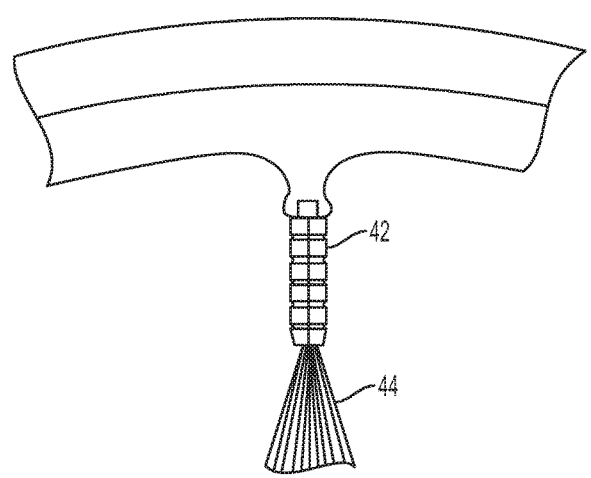
FIG. 6A is a front view of the finger and conductive fiber after crimping of the finger and fanning of the conductive fiber, according to one embodiment.
Figure 6B:
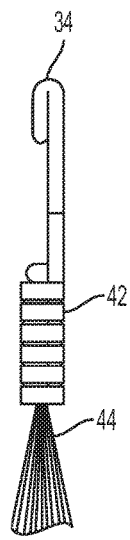
FIG. 6B is a side view of FIG. 6A.

Referring to FIGS. 4A and 4B, the fingers 42 are then bent, wrapped, rounded to create a hollow interior or receptacle for receiving the conductive fibers. In one embodiment, the fingers 42 are bent to form a U-shaped recess 52. In other embodiments, the recess is circular. The recess 52 is sized to receive a bundle of the conductive fibers 44, shown assembled within the recess in FIG. 5. Optionally, the recess may be provided with a conductive epoxy to bind the fibers 44 to the fingers 42 within the recesses 52, or even before the fingers 42 are bent or rounded. The conductive epoxy may be provided prior to inserting the conductive fiber 44 into the recess 52. Then, as shown in FIGS. 6A and 6B, the fingers 42 may be crimped to further retain the conductive fibers 44. The conductive fibers 44 may be fanned or expanded, for example as a result of the crimping.

The embodiments described above and shown in the Figures provide a bearing with a shunt ring having its outer diameter contacting the outer ring, and fingers and conductive fibers extending radially inward to contact the inner ring. However, it should be understood that this disclosure is not limited to such an embodiment. For example, in another embodiment, the shunt ring has a continuous inner diameter surface contacting the inner bearing ring, and the fingers extend radially outward from an outer diameter surface of the shunt ring with its fibers contacting the outer ring. In such an embodiment, the diameter of the outer diameter surface of the shunt ring is less than the pitch diameter of the rolling elements so that the rolling elements are not substantially covered by the shunt ring and free-flow of fluid is again enabled. FIG. 1B shows a shunt ring assembly on one side of the bearing, however, the bearing may include a shunt on both sides.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A bearing comprising:
an inner ring about a central axis;
an outer ring disposed radially outward from the inner ring;
a plurality of rolling elements disposed between the inner ring and the outer ring, and configured to enable relative circumferential movement between the inner ring and the outer ring, the plurality of rolling elements defining a pitch diameter;
an electrically-conductive shunt ring having an outer diameter surface contacting the outer ring, and an inner diameter surface, the shunt ring being axially spaced from the rolling elements;
a plurality of fingers extending from the inner diameter surface and toward the inner ring; and
a plurality of carbon fiber elements extending from each finger and contacting the inner ring to conduct electrical current between the inner ring and outer ring;
wherein the inner diameter surface of the shunt ring defines a diameter that exceeds the pitch diameter to enable free-flow of lubricant through the bearing.

2. The bearing of claim 1, wherein the bearing does not include a seal that prevents lubricant from contacting the rolling elements.

3. The bearing of claim 1, wherein the outer ring includes an inner surface defining a recess, and the outer diameter surface of the shunt ring is provided in the recess with an interference fit.

4. The bearing of claim 1, wherein each finger is wrapped to define hollow interiors of the fingers, and each of the carbon fiber elements are each disposed in a respective one of the hollow interiors.

5. The bearing of claim 4, further comprising a conductive epoxy within each of the hollow interiors binding the carbon fiber elements to the hollow interiors.

6. A bearing comprising:
an inner ring extending about an axis;
an outer ring concentric with and radially outward from the inner ring;
a plurality of rolling elements disposed between the inner ring and the outer ring, the rolling elements collectively defining a pitch diameter; and
an electrically-conductive shunt ring coupling the inner ring to the outer ring and configured to inhibit electrical current passing between raceways of the inner ring and outer ring from passing through the rolling elements;
wherein the bearing is open on either axial side of the rolling elements and the shunt ring is sized to enable lubricant to flow freely.

7. The bearing of claim 6, wherein the shunt ring has an outer diameter surface contacting the outer ring, and an inner diameter surface defining a diameter that exceeds the pitch diameter.

8. The bearing of claim 7, wherein the shunt ring includes a plurality of fingers extending radially inward from the inner diameter surface.

9. The bearing of claim 8, further comprising carbon fiber elements extending radially inward from the fingers and contacting the inner ring.

10. The bearing of claim 9, wherein the fingers are bent to surround the carbon fiber elements.

11. The bearing of claim 9, further comprising a conductive epoxy connecting the carbon fiber elements and the fingers.

12. The bearing of claim 6, wherein the bearing includes only one shunt ring on one axial side of the rolling elements.

13. The bearing of claim 6, wherein the bearing includes one shunt ring on either axial side of the rolling elements.

14. A bearing comprising:
an inner ring extending about an axis;
an outer ring concentric with and radially outward from the inner ring;
a plurality of rolling elements disposed between the inner ring and the outer ring, wherein the inner and outer rings define a pair of axial sides of the bearing that are open and not sealed to allow lubricant to flow through the bearing and contact the rolling elements; and
an electrically-conductive shunt ring having an outer end contacting the inner ring, the shunt ring having a plurality of conductive fingers circumferentially spaced apart and extending radially outward toward the outer ring to conduct electrical current between the inner ring and outer ring.

15. The bearing of claim 14, further comprising a plurality of conductive filaments each having an outer end connected to one of the fingers and an inner end contacting the outer ring.

16. The bearing of claim 14, wherein the rolling elements collectively define a pitch diameter, and the shunt ring has an inner end that contacts the inner ring and an outer end defining a diameter that is less than the pitch diameter.

17. The bearing of claim 16, further comprising a plurality of conductive filaments each having an inner end connected to one of the fingers and an outer end contacting the outer ring.

18. The bearing of claim 14, wherein the fingers are rounded and define a hollow opening, and a plurality of conductive fillers are attached within the hollow opening with a conductive epoxy.

\* \* \* \* \*